US005248355A

United States Patent [19]

Olsen

[11] Patent Number: 5,248,355

[45] Date of Patent: Sep. 28, 1993

[54] APPARATUS FOR APPLYING HEAT SENSITIVE LABELS AND PRESSURE SENSITIVE LABELS

[75] Inventor: Robert F. Olsen, Perrysburg, Ohio

[73] Assignee: Owens-Illinois Plastic Products Inc., Toledo, Ohio

[21] Appl. No.: 632,234

[22] Filed: Dec. 20, 1990

[51] Int. Cl.[5] .............................................. B32B 31/00

[52] U.S. Cl. ...................................... 156/64; 156/361; 156/542

[58] Field of Search ............... 156/540, 541, 542, 360, 156/64, 361

[56] References Cited

U.S. PATENT DOCUMENTS 4,732,641 3/1988 Nechay et al. ...................... 156/567

*Primary Examiner*—David A. Simmons

*Assistant Examiner*—William J. Matney, Jr.

[57] ABSTRACT

An apparatus for applying heat sensitive labels and pressure sensitive labels wherein the apparatus can be readily changed to apply heat sensitive labels or pressure sensitive labels from a web along which the labels are positioned. In one mode for applying heat sensitive labels, the web is moved from a feed reel adjacent a preheater and a platen where successive labels are peeled from the web and applied to successive containers on a turret and thereafter the web is stored on a take-up reel. In a second mode, the preheater and platen are removed, a peel bar assembly is positioned in place of the platen, and the web with the labels thereon is moved about the peel bar assembly to peel a label from the web and apply the pressure sensitive label to an article on the turret and the web is thereafter redirected to the take-up reel.

7 Claims, 6 Drawing Sheets

APPARATUS FOR APPLYING HEAT SENSITIVE LABELS AND PRESSURE SENSITIVE LABELS

This invention relates to applying labels to articles and particularly applying labels to articles by removal of the labels from a web upon which they are stored and application thereof to the articles.

BACKGROUND AND SUMMARY OF THE INVENTION

In the application of labels by what is known as transfer labeling, it is customary to position labels on a web and thereafter transfer the labels to the article to be labeled. In one type of such labeling, heat sensitive labels are used which must be heated and applied to the articles. In another type, pressure sensitive labels are used which must be removed from the web and applied to the article. Heretofore, it has been common to have separate apparatus for handling each of these types of labels.

Among the objectives of the present invention are to provide a method and apparatus for having one apparatus that can be readily changed for usage either for applying heat sensitive labels or for applying pressure sensitive labels; which apparatus utilizes the basic mechanism heretofore available for heat sensitive labels and conversion mechanisms such that the apparatus can be readily used in applying pressure sensitive labels; which involves a minimal change; wherein the additional mechanisms are relatively low in cost compared with having a separate apparatus for applying pressure sensitive labels and wherein the change from one mode to another is readily achieved.

In accordance with the invention, the apparatus for applying heat sensitive labels and pressure sensitive labels wherein the apparatus can be readily changed to apply heat sensitive labels or pressure sensitive labels from a web along which the labels are positioned comprises apparatus. In one mode for applying heat sensitive labels, the web is moved from a feed reel adjacent a preheater and a platen wherein successive labels are peeled from the web and applied to successive containers on a turret and thereafter the web is stored on a take-up reel. In a second mode, the preheater and platen are removed, a peel bar assembly is positioned in place of the platen and the web with the labels thereon is moved about the peel bar assembly to peel a label from the web and apply the pressure sensitive label to a article on the turret and the web is thereafter redirected to the take-up reel.

More specifically, the invention provides for to the interchangeable conversion between a heat sensitive mode for applying heat sensitive labels and a pressure sensitive mode for applying pressure sensitive labels utilizing a currently available apparatus for applying heat sensitive labels. Such apparatus includes a feed reel having a web with heat sensitive labels is provided to supply the web around a metering roll, then over an idler roll, over a shuttle that reciprocates to change the direction of movement of the labels for controlling the web and over a preheat assembly to a platen that is movable into and out of position for applying the heated label to an article on a turret. Such an apparatus further includes a take-up shuttle roll, and an idler roll directing the web to a take-up reel. The supply of the web by the feed reel is determined by the metering roll and the take-up of web by the reel is continuous while the motion of individual labels varies by a label shuttle mechanism. In accordance with the invention, in order to convert the apparatus to the application of pressure sensitive labels, the preheater platen and cam drum for moving platen into and out of position are removed and a peel bar assembly is positioned adjacent the articles. In addition, a lost motion mechanism is provided to provide a tension on the portion of the web as it passes to the take-up reel.

DESCRIPTION

In accordance with the invention, the basic apparatus for applying heat sensitive labels is utilized for applying pressure sensitive labels wherein the apparatus can be readily changed to apply heat sensitive labels or pressure sensitive labels from a web along which the labels are positioned. In one mode for applying heat sensitive labels, the web is moved from a feed reel adjacent a preheater and a platen where successive labels are applied directly from the web to successive non-rotating oval containers on a turret and thereafter the web is stored on a take-up reel. In a second mode, the preheater and platen are removed, a peel bar assembly is positioned in place of the platen and the web with the labels thereon is moved about the peel bar assembly to peel a label from the web and apply the pressure sensitive label to a article on the turret and the web is thereafter redirected to the take-up reel.

Figure 1:
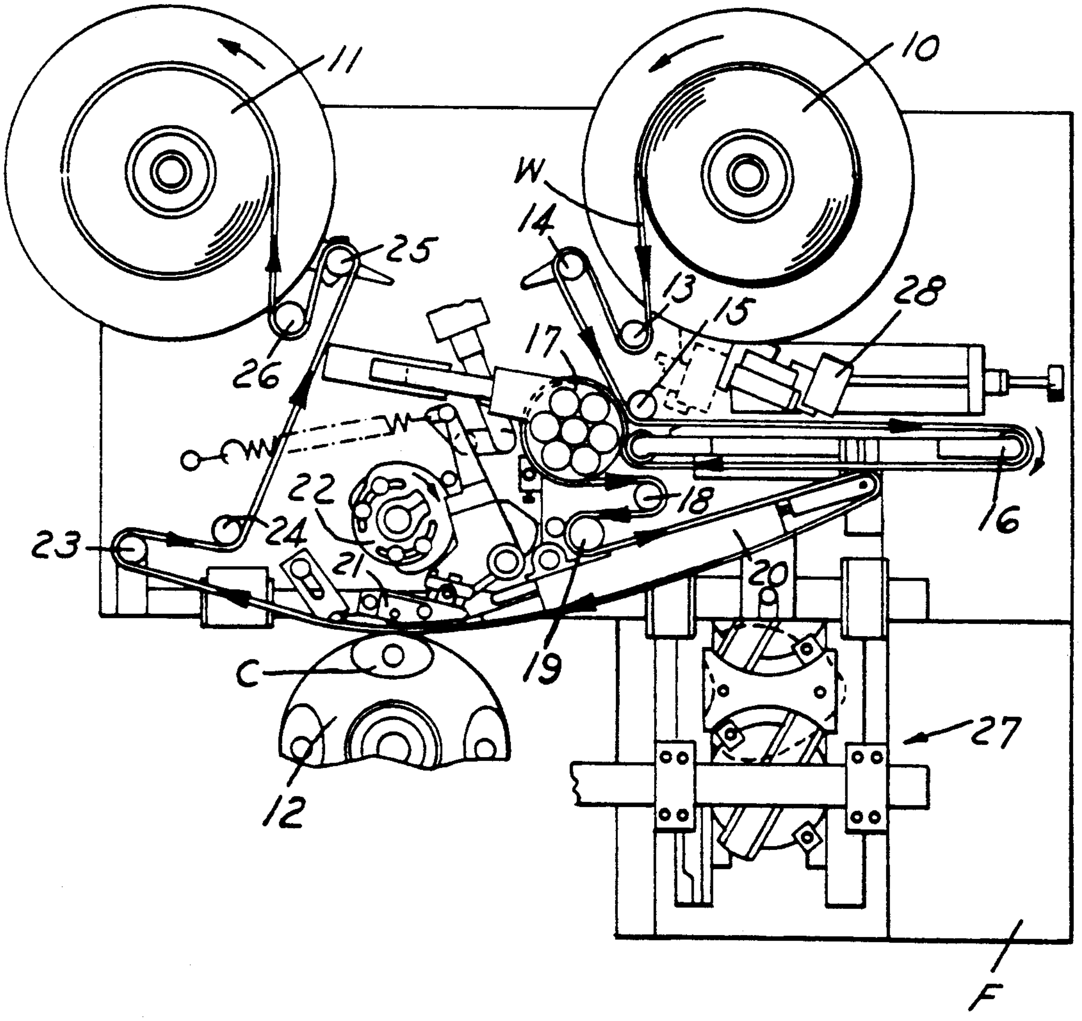
FIG. 1 PRIOR ART
FIG. 1 is a schematic diagram of a prior art mechanism for applying heat sensitive labels.

Referring to FIG. 1, the conventional apparatus for applying heat sensitive labels comprises a frame F which supports a feed reel 10 for a web having heat sensitive labels thereon. The web passes under an idler roller 13, over an dancer roller 14, under an idler roller 15 and scanner plate having rollers thereon. The web thereafter passes thereafter over a metering mechanism 17 and shuttle roller 18, and roller 19 beneath a preheater 20 to a platen 21 that is reciprocated by cam drum 22 into and out of position to apply pressure on the web W and pressing the label against an article C which comprises one of a plurality of articles such as containers on a turret 12. The web then passes over idler rollers 23, 24, 25, 26 and is wound on a take-up reel 11. The supply of the web by the feed reel 10 and the take-up of the web by the take-up reel 11 is continuous while the motion of the individual labels varies to register the pressure sensitive labels with the articles.

Figure 2:
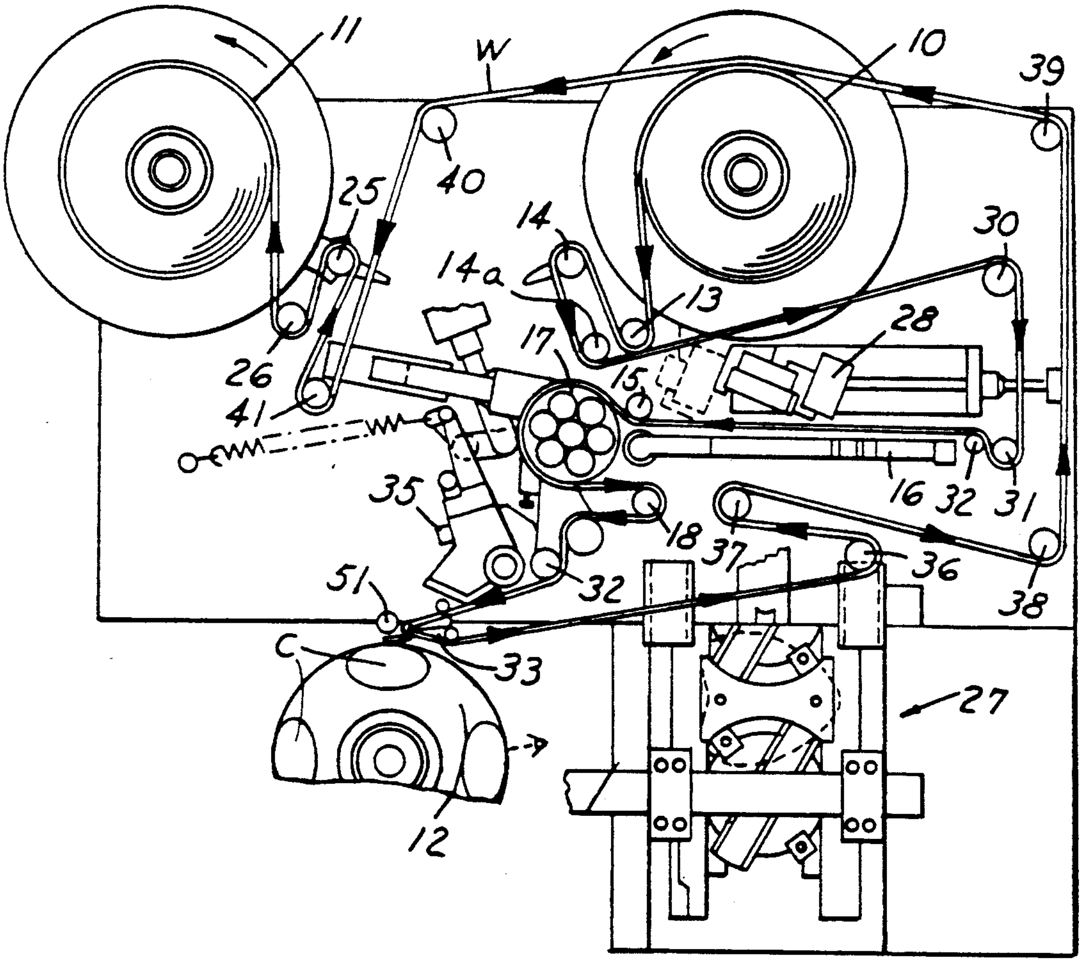
FIG. 2 is a schematic diagram showing the apparatus as it is converted for application of pressure sensitive labels.

Referring to FIG. 2 which is a schematic view of the apparatus converted to apply pressure sensitive labels, in order to convert the apparatus, the preheater 20, platen 21 and cam drum 22 are removed from the frame. Rollers 30, 31, 14a, and 32 redirect the web past a scanner 16 and, a peel bar assembly 33 is provided, and a stop 35 is provided to hold the prior peel bar support out of position. Thus, the web bearing the pressure sensitive labels is trained about the rollers 13, 14, 14a, 30, 31, 32, 15, metering roll 17, and rollers 18, 32, over the peel bar assembly 33 where the change in direction of the web strips each label so that it can be applied to the articles C on the turret 12. The roller 18 and roller 37 are supported as presently described for reciprocating movement so that the web after leaving the peel bar assembly 33 passes about the idler roller 36 and rolls 37, 38, 39, 40, 41 over the idler rollers 25, 26 to the take-up reel 11.

Figure 3:
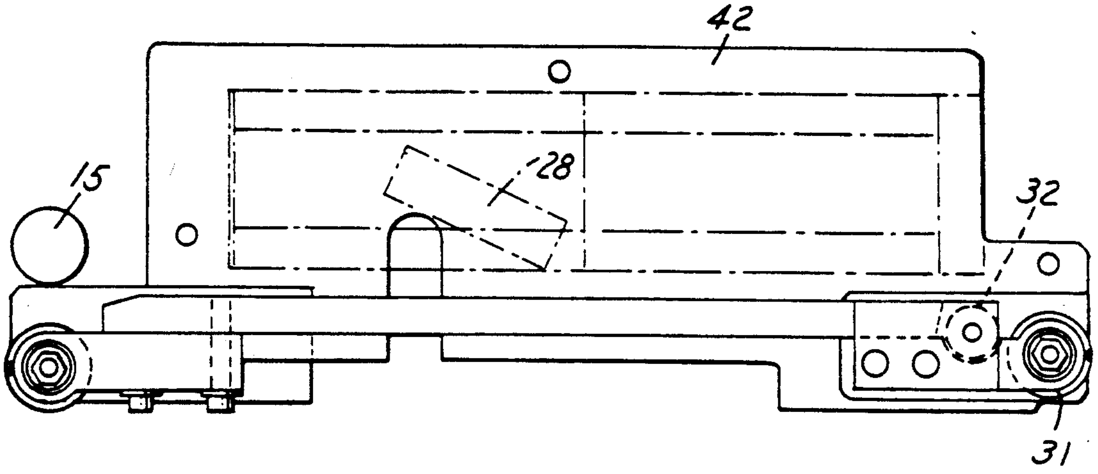
FIG. 3 is an elevational view of a conversion mechanism utilized in the apparatus.

Referring to FIG. 3, it can be seen that the rollers 31 and 32 are mounted on the same housing 42 that supports the conventional photosensor 28 for controlling registration of the label as is well known in the art.

Figure 6:
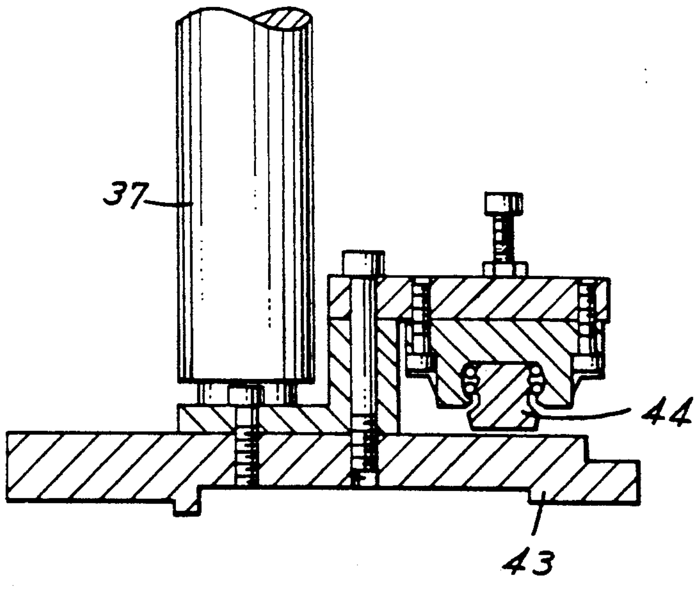
FIG. 6 is a sectional view taken along the line 6—6 in FIG. 5.
Figure 4:
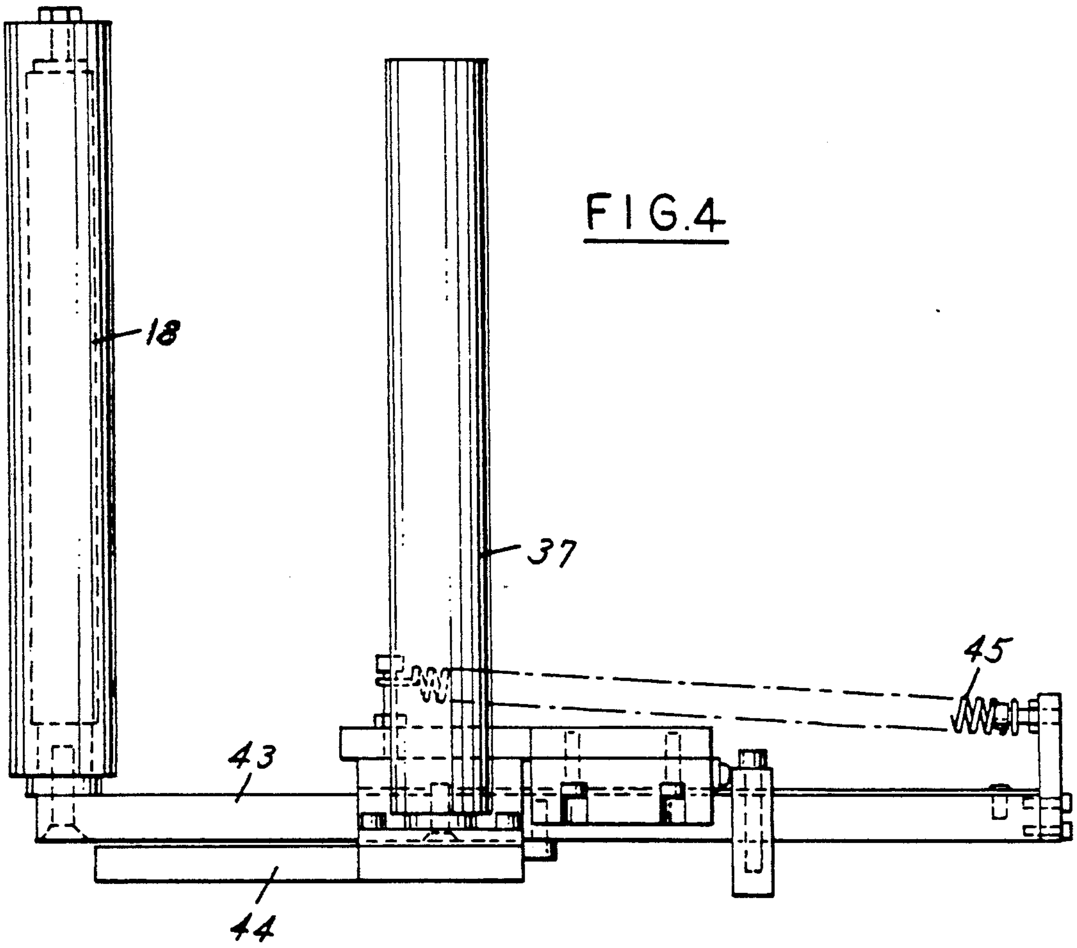
FIG. 4 is an elevational view of a lost motion mechanism utilized in the apparatus.
Figure 5:
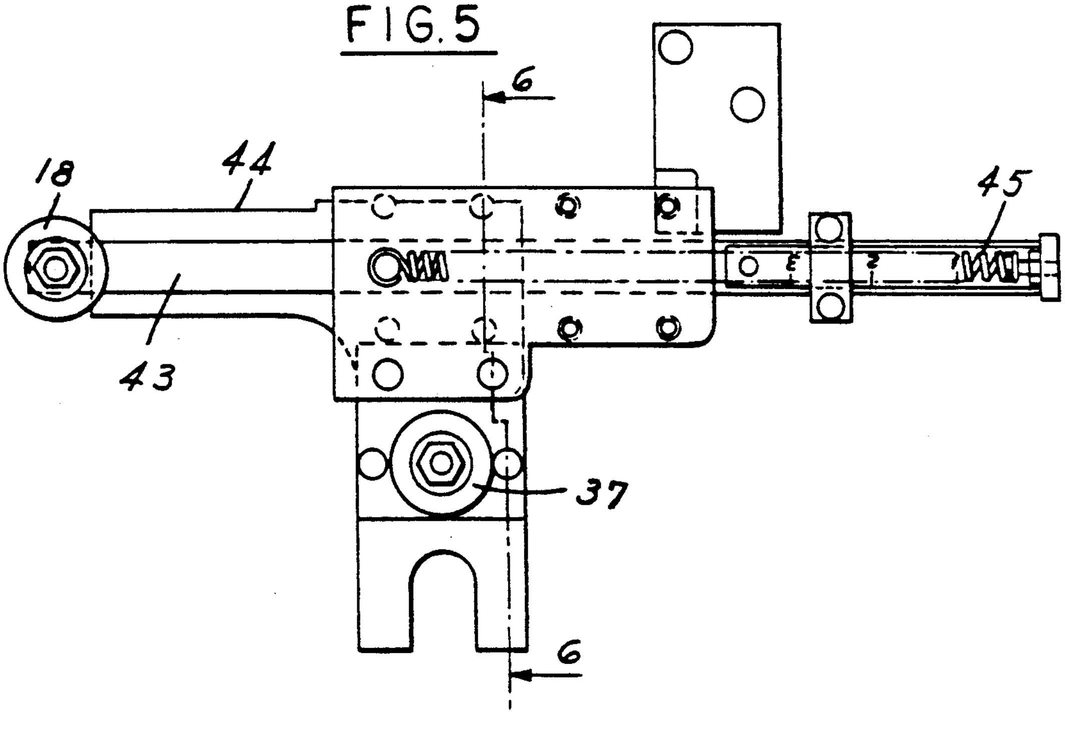
FIG. 5 is a plan view of the apparatus shown in FIG. 4.

Referring to FIGS. 4-6, the rollers 18, 37 are mounted on a slide 43 for relative sliding movement with respect to a shuttle 44 that is reciprocated back and forth on the shuttle mechanism 27. The slide 43 thus moves with the shuttle 44 out is able to move relative thereto depending on the tension of the web. A tension spring 45 extends from the slide 43 to the shuttle 44.

Figure 7:
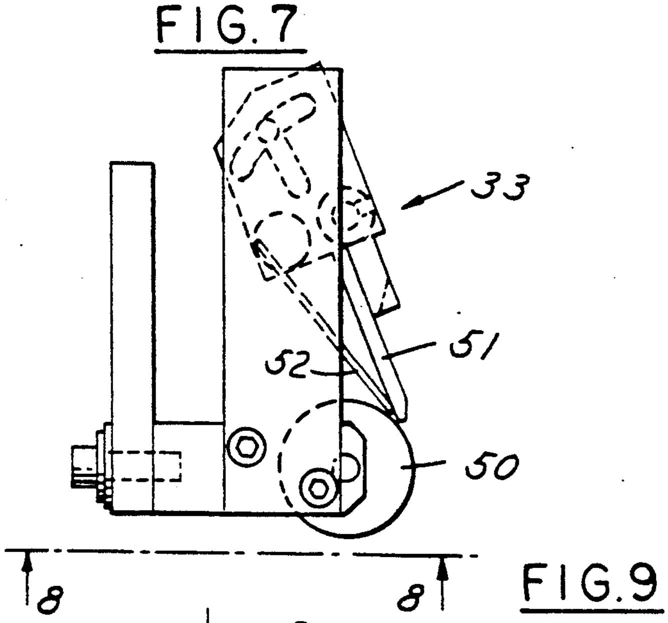
FIG. 7 is a plan view of the peel bar assembly.
Figure 8:
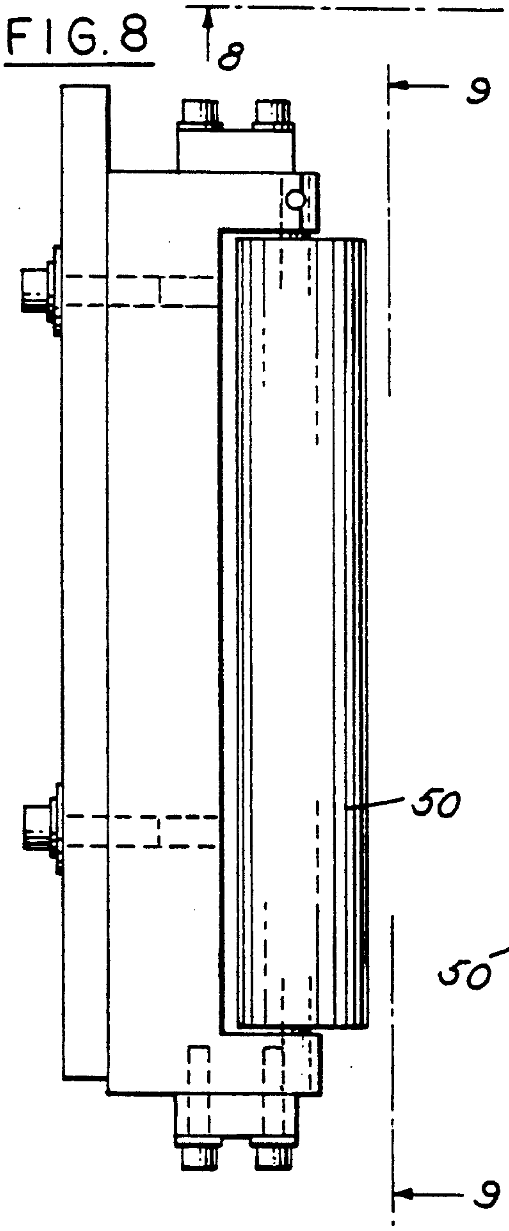
FIG. 8 is a view taken along the line 8—8 in FIG. 7.
Figure 9:
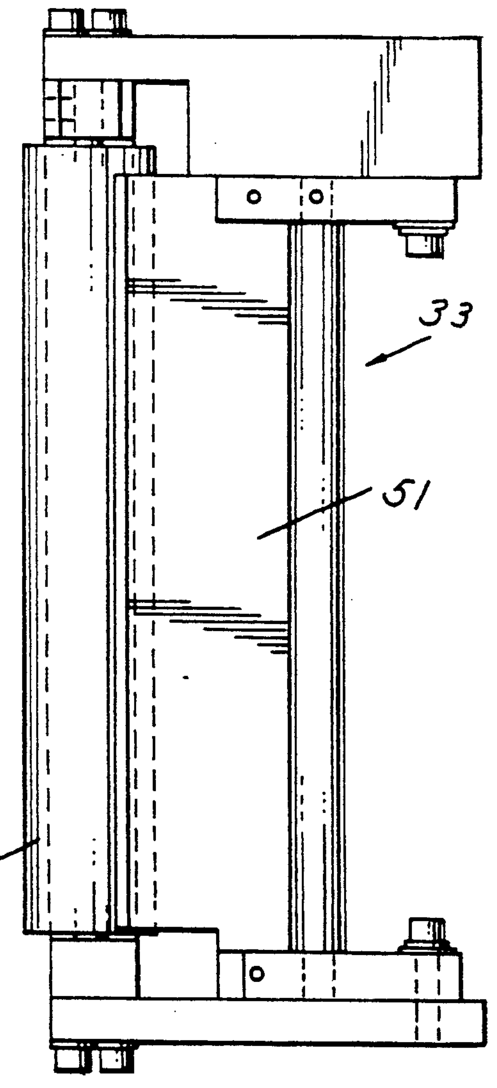
FIG. 9 is a view taken along the line 9—9 in FIG. 8.

Referring to FIGS. 7-9, the peel bar assembly 33 includes an idler roller 50 and a peel blade 51. As the web with the pressure sensitive label approaches the peel blade 51, it passes between the peel blade 51 and the roller 50 and past the tip of the platen 51 so that the web changes direction and the label is peeled from the web. A flat spring 52 provides friction tension on the label and causes it to curl toward the roller 50.

Figure 10:
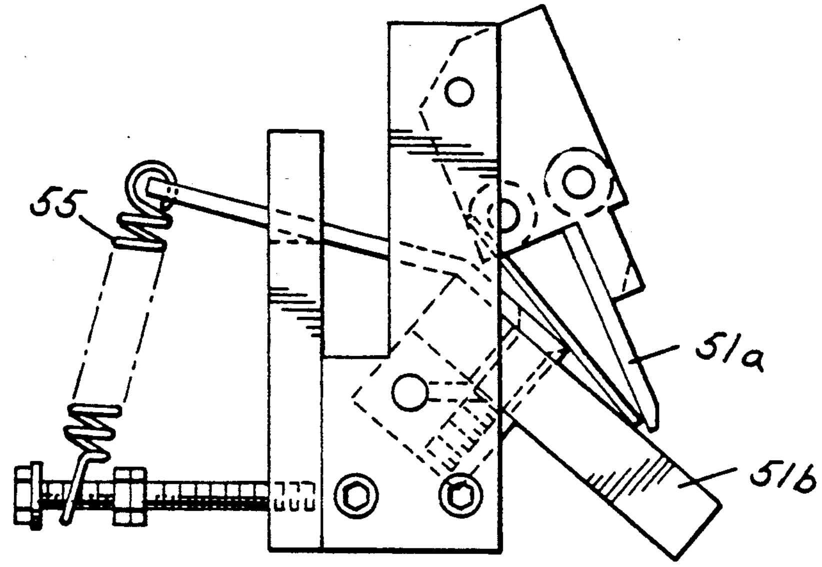
FIG. 10 is a plan view of a modified peel bar assembly.

In the modified form of platen assembly shown in FIG. 10, the platen 51a is mounted so that it is yieldingly acted upon by a tension spring 55.

Figure 11:
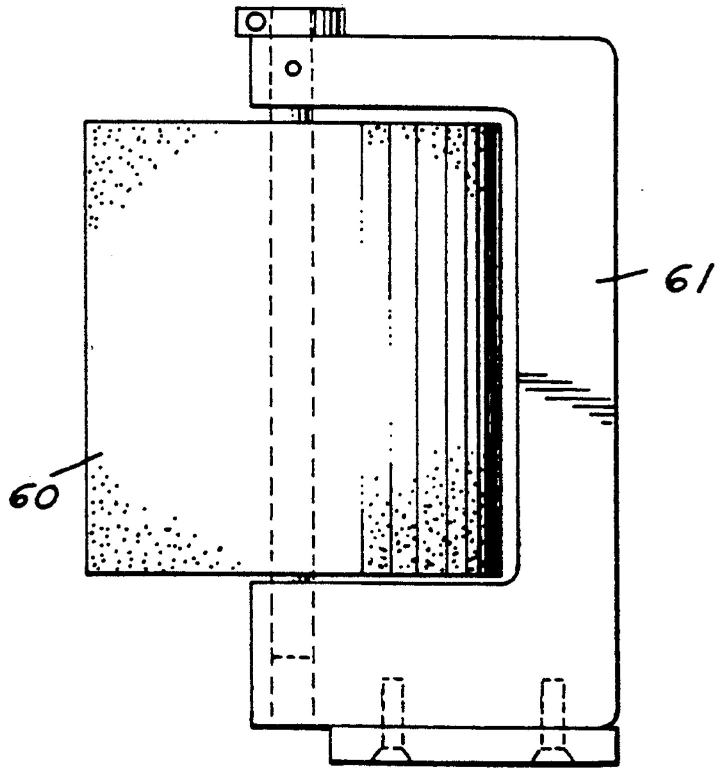
FIG. 11 is an elevational view of a compressible roller assembly.

In FIG. 11, there is shown a foam roller 60 mounted for rotation on a bracket 61 that is positioned adjacent the turret such that it applies a pressure force to the label after it has been applied to the article.

It can thus be seen that there has been provided a method and apparatus for applying heat sensitive labels and pressure sensitive labels wherein the apparatus can be readily changed to apply heat sensitive labels or pressure sensitive labels from a web along which the labels are positioned. In one mode for applying heat sensitive labels, the web is moved from a feed reel adjacent a preheater and a platen where successive labels are applied directly from the web to successive containers on a turret and thereafter the web is stored on a take-up reel. In a second mode, the preheater and platen are removed, a peel bar assembly is positioned in place of the platen, and the web with the labels thereon is moved about the peel bar assembly to peel a label from the web and apply the pressure sensitive label to an article on the turret and the web is thereafter redirected to the take-up reel.

I claim:

1. The method of utilizing an apparatus for applying heat sensitive labels to a container to apply pressure sensitive labels wherein the apparatus applying heat sensitive labels includes a web on which the heat sensitive labels are moved from a feed reel adjacent a preheater and a platen where successive labels are applied directly from the web to successive containers on a turret and thereafter the web is stored on a take-up reel, which method comprises removing the preheater and platen, positioning a peel bar assembly in place of the platen, providing means for moving the web with the pressure sensitive labels thereon about the peel bar assembly to peel a label from the web, applying the pressure sensitive label to an article on the turret, and providing means for redirecting the web to a take-up reel.

2. The method set forth in claim 1 including providing a pair of relatively movable rollers over which the web is moved to the peel bar assembly, and reciprocating said rollers in the path of the web.

3. The method set forth in claim 1 including the step of providing a resilient force on said container after the label is applied thereto.

4. An apparatus which can be used for applying heat sensitive labels or applying pressure sensitive labels wherein the apparatus applying heat sensitive labels comprises a feed reel from which a web of heat sensitive labels can be moved from said feed reel, a preheater, a platen where successive labels are applied by pressure directly from the web to successive containers on a turret, and a take-up reel wherein the web is stored, said preheater and platen being removable, a peel bar assembly adapted to be positioned in place of the platen, additional means for moving the web with the pressure sensitive labels thereon about the peel bar assembly to peel a label from the web, and apply the pressure sensitive label to an article on the turret, and additional means for redirecting the web to a take-up reel.

5. The apparatus set forth in claim 4 including a roller assembly adapted to be removably mounted in the path of the web to the peel bar assembly, said roller assembly comprising a reciprocable frame, and a pair of rollers mounted on said frame for relative reciprocable movement.

6. The apparatus set forth in claim 4 including a removable resilient roller adapted to be mounted adjacent said container for applying a resilient force to the pressure sensitive label on the container.

7. An apparatus which can be used for applying heat sensitive labels or applying pressure sensitive labels wherein the apparatus applying heat sensitive labels comprises a feed reel from which a web of heat sensitive labels can be moved from said feed reel, a preheater, a platen where successive labels are applied by pressure directly from the web to successive containers on a turret, and a take-up reel wherein the web is stored, said platen being removable, a peel bar assembly adapted to be positioned in place of the platen, additional means for moving the web with the pressure sensitive label thereon about the peel bar assembly to peel a label from the web, and apply the pressure sensitive label to an article on the turret, and additional means for directing the web to a take-up reel.

* * * * *